(12) United States Patent
Jia

(10) Patent No.: US 11,258,934 B2
(45) Date of Patent: Feb. 22, 2022

(54) IMAGE CAPTURING ASSEMBLY AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/909,426

(22) Filed: Jun. 23, 2020

(65) Prior Publication Data

US 2020/0322515 A1 Oct. 8, 2020

Related U.S. Application Data

(63) Continuation of application No. PCT/CN2019/075904, filed on Feb. 22, 2019.

(30) Foreign Application Priority Data

Mar. 6, 2018 (CN) .......................... 201810184560.5

(51) Int. Cl.
*H04N 5/225* (2006.01)
*H04N 5/232* (2006.01)
(Continued)

(52) U.S. Cl.
CPC ......... *H04N 5/2257* (2013.01); *G06F 1/1686* (2013.01); *H04N 5/2252* (2013.01); *H04N 5/23299* (2018.08); *H04M 1/0264* (2013.01)

(58) Field of Classification Search
CPC .............. G06F 1/1686; H04M 1/0264; H04M 2250/20; H04N 5/2252; H04N 5/2257; H04N 5/23299
See application file for complete search history.

(56) References Cited

U.S. PATENT DOCUMENTS 6,898,301 B2 * 5/2005 Iwanaga ............ G06K 9/00026
283/68
7,264,171 B2 * 9/2007 Yang ..................... G06F 1/1681
235/472.01
(Continued)

FOREIGN PATENT DOCUMENTS

CN           1869753 A    11/2006
CN         201957073 U     8/2011
(Continued)

OTHER PUBLICATIONS

English translation of OA for CN application 201810184560.5 dated Feb. 6, 2020.
(Continued)

*Primary Examiner* — Amy R Hsu
(74) *Attorney, Agent, or Firm* — Young Basile Hanlon & MacFarlane, P.C.

(57) ABSTRACT

An image capturing assembly and an electronic device are provided. The image capturing assembly includes a housing and an imagining module. The house includes a side wall, the side wall has a notch, and the housing is provided with an accommodating groove communicated with the notch. The image capturing module includes an image capturing portion and a rotating shaft portion, the rotating shaft portion is accommodated in the notch, and the image capturing portion is rotatably connected with the housing through the rotating shaft portion. The rotating shaft portion includes a rotating shaft and a movable member, the movable member is fitted over the rotating shaft, the image capturing portion is connected with the rotating shaft and is configured to be driven by the rotating shaft to rotate among a first position, a second position and a third position.

16 Claims, 11 Drawing Sheets

(51) Int. Cl.
*G06F 1/16* (2006.01)
*H04M 1/02* (2006.01)

(56) References Cited

U.S. PATENT DOCUMENTS

| | | | |
|---|---|---|---|
| 10,284,697 B2* | 5/2019 | Yin | H04W 88/02 |
| 2004/0107537 A1* | 6/2004 | Ahn | H04M 1/0264 |
| | | | 16/221 |
| 2005/0168628 A1* | 8/2005 | Wang | H04M 1/0214 |
| | | | 348/375 |
| 2008/0194290 A1* | 8/2008 | Lebert | G01D 5/145 |
| | | | 455/556.1 |
| 2018/0041692 A1* | 2/2018 | Qin | H04N 5/23216 |
| 2018/0091711 A1* | 3/2018 | Huang | H04N 7/185 |

FOREIGN PATENT DOCUMENTS

| | | |
|---|---|---|
| CN | 104469114 A | 3/2015 |
| CN | 204334742 U | 5/2015 |
| CN | 105979032 A | 9/2016 |
| CN | 205961284 U | 2/2017 |
| CN | 206117742 U | 4/2017 |
| EP | 1383324 A1 | 1/2004 |

OTHER PUBLICATIONS

English translation of ISR for PCT application PCT/CN/2019075904 dated May 31, 2019.
Extended European Search Report for EP application 19763246.6 dated Dec. 2, 2020.
Indian Examination Report for IN Application 202017027349 dated Sep. 8, 2021. (6 pages).

* cited by examiner

IMAGE CAPTURING ASSEMBLY AND ELECTRONIC DEVICE

CROSS-REFERENCE TO RELATED APPLICATION(S)

The present application is a continuation of International Application PCT/CN2019/075904, filed on Feb. 22, 2019, which claims priority to Chinese Patent Application No. 201810184560.5 filed on Mar. 6, 2018, the entire contents of both of which are incorporated herein by reference.

TECHNICAL FIELD

The present disclosure relates to a technical field of electronic devices, and more particularly to an image capturing assembly and an electronic device.

BACKGROUND

In the related art, an image capturing module of a mobile terminal such as a mobile phone may be flipped from a back to a front of the mobile phone for the front image capturing. However, the image capturing module may interfere with a housing of the mobile terminal in the process of rotation, causing that the image capturing module cannot be rotated and unfolded completely for the front image capturing. Therefore, how to ensure a smooth rotation of the image capturing module becomes a technical problem to be solved.

SUMMARY

The present disclosure provides an image capturing assembly and an electronic device.

The image capturing assembly according to a first aspect of embodiments of the present disclosure includes a housing and an imagining module. The house includes a side wall, the side wall has a notch, and the housing is provided with an accommodating groove communicated with the notch. The image capturing module includes an image capturing portion and a rotating shaft portion, the image capturing portion includes an image capturing surface and a non-image capturing surface opposite to each other, the rotating shaft portion is accommodated in the notch, and the image capturing portion is rotatably connected with the housing through the rotating shaft portion. The rotating shaft portion includes a rotating shaft and a movable member, the movable member is fitted over the rotating shaft, the image capturing portion is connected with the rotating shaft and is configured to be driven by the rotating shaft to rotate among a first position, a second position and a third position. When being in the first position, the image capturing portion is at least partially received in the accommodating groove, and the movable member is limited in a position that the movable member has a smooth connection with the image capturing surface. When the image capturing portion is rotated from the first position to the second position, the movable member is driven by the rotating shaft to rotate to abut against an inner side surface of the notch. When being in the third position, the image capturing portion is fully unfolded with respect to the accommodating groove, and the movable member is limited in a position that the movable member has a smooth connection with the non-image capturing surface.

The electronic device according to a second aspect of embodiments of the present disclosure includes: a housing including a base plate and a side wall arranged at an edge of the base plate, the side wall having a notch on a side of the base plate, the housing being provided with an accommodating groove communicated with the notch; a display screen enclosed in the housing, connected to the side wall and arranged on another side of the base plate opposite to the side of the base plate where the notch is; and an image capturing module including an image capturing portion and a rotating shaft portion, the image capturing portion including an image capturing surface and a non-image capturing surface opposite to each other, the rotating shaft portion being accommodated in the notch, and the image capturing portion being rotatably connected with the housing through the rotating shaft portion. The rotating shaft portion includes a rotating shaft and a movable member, the movable member is fitted over the rotating shaft, the image capturing portion is connected with the rotating shaft and configured to be driven by the rotating shaft to rotate among a first position, a second position and a third position. When being in the first position, the image capturing portion is at least partially received in the accommodating groove, the movable member is limited in a position that the movable member has a smooth connection with the image capturing surface. When the image capturing portion is rotated from the first position to the second position, the movable member is driven by the rotating shaft to rotate to abut against an inner side surface of the notch. When being in the third position, the image capturing portion is fully unfolded with respect to the accommodating groove, and the movable member is limited in a position that the movable member has a smooth connection with the non-image capturing surface.

The image capturing assembly according to a third aspect of embodiments of the present disclosure includes: a housing including a side wall having a notch; and an image capturing module including a rotating shaft portion accommodated in the notch and an image capturing portion rotatably connected to the housing through the rotating shaft portion, the image capturing portion having an image capturing surface and a non-image capturing surface opposite to each other. The rotating shaft portion includes a rotating shaft and a movable member, the movable member is fitted over the rotating shaft and rotatable with respect to the rotating shaft, the image capturing portion is connected with the rotating shaft and configured to be driven by the rotating shaft to switch among a first position, a second position and a third position. When the image capturing portion is in the first position, at least part of the image capturing portion is received in the housing, and the movable member has a smooth connection with the image capturing surface. When the image capturing portion is rotated from the first position to the second position, the movable member is driven by the rotating shaft to rotate until abuts against an inner side surface of the notch. When being in the third position, the image capturing portion is completely unfolded out of the housing, and the movable member has a smooth connection with the non-image capturing surface.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the drawings.

DETAILED DESCRIPTION

Figure 1:
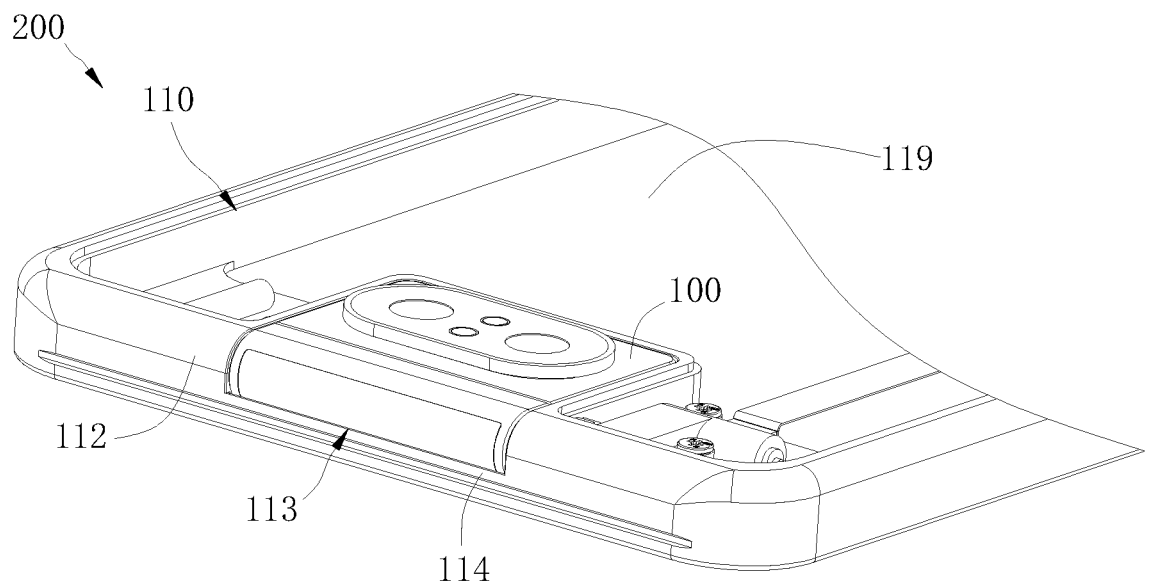
FIG. 1 is a partial perspective view of an image capturing assembly according to an embodiment of the present disclosure.

Embodiments of the present disclosure are further described. Examples of the embodiments are illustrated in the accompanying drawings. The same or similar elements and the elements having same or similar functions are denoted by like reference numerals throughout the descriptions. The embodiments described below with reference to the accompanying drawings are examples, are intended to be used to explain the present disclosure, and cannot be construed as limitation to the present disclosure.

In the present disclosure, it should be noted, unless specified or limited otherwise, the terms "mounted," "connected," "coupled" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure may be understood by those skilled in the art according to particular circumstances.

In the present disclosure, the first feature "on" the second feature may be that the first feature and the second feature are in a direct contact, or that the first feature and the second feature are not in a direct contact, but in a contact through another feature therebetween.

Figure 2:
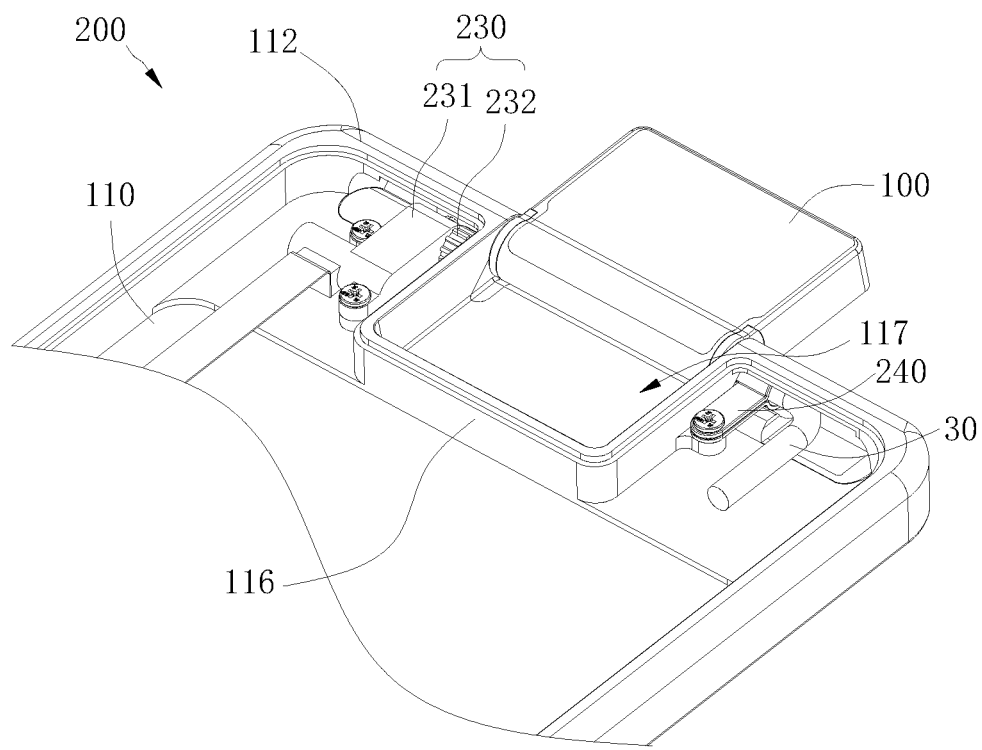
FIG. 2 is a partial perspective view of an image capturing assembly in another state according to an embodiment of the present disclosure.

As illustrated in FIG. 1 and FIG. 2, an image capturing assembly 200 according to an embodiment of the present disclosure includes a housing 110 and an image capturing module 100. The housing 110 includes a side wall 112, and the side wall 112 has a notch 113. The housing 110 is provided with an accommodating groove 117 communicated with the notch 113.

Figure 6:
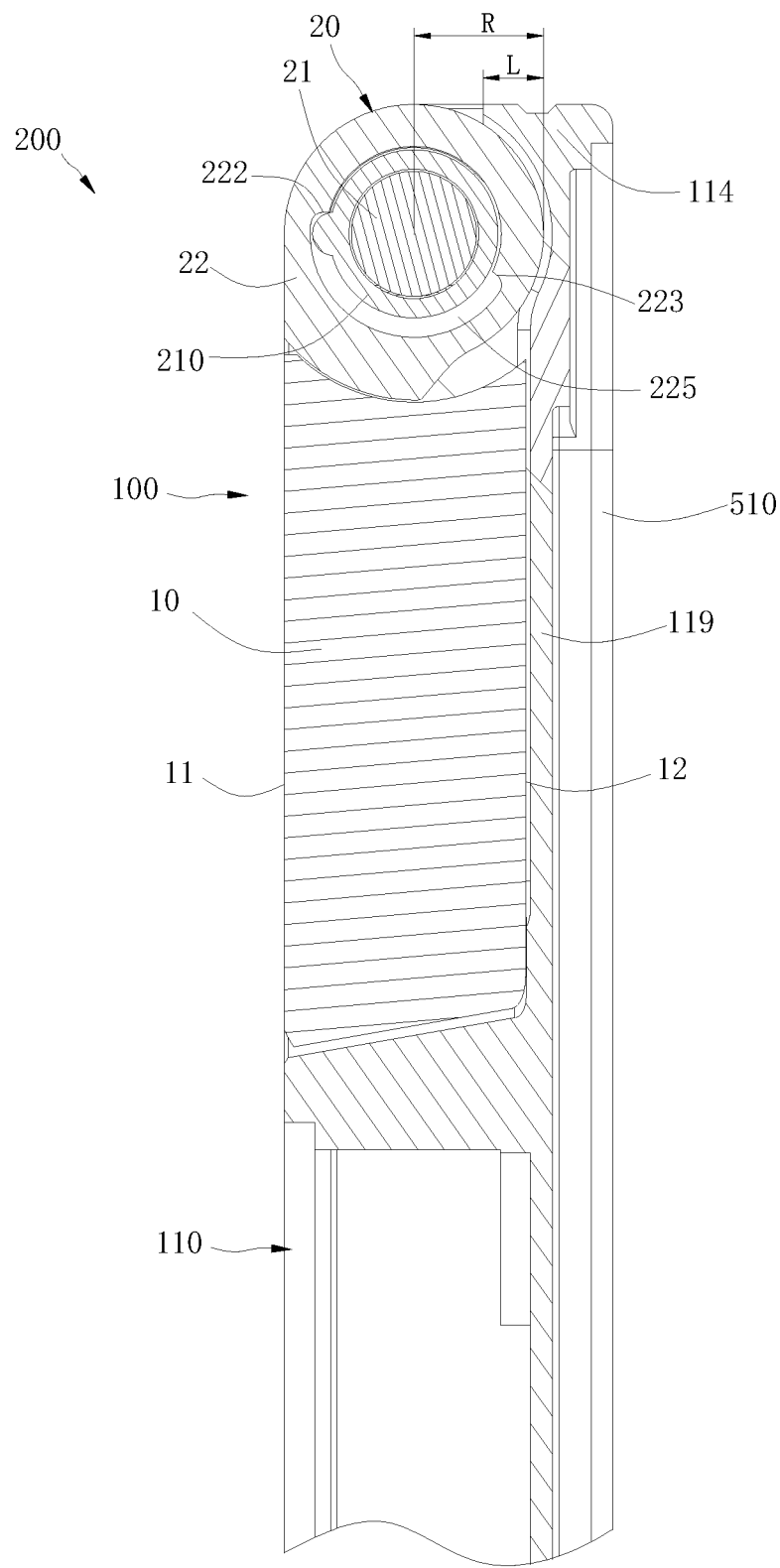
FIG. 6 is a sectional view of the image capturing assembly along a line VI-VI in FIG. 4.
Figure 9:
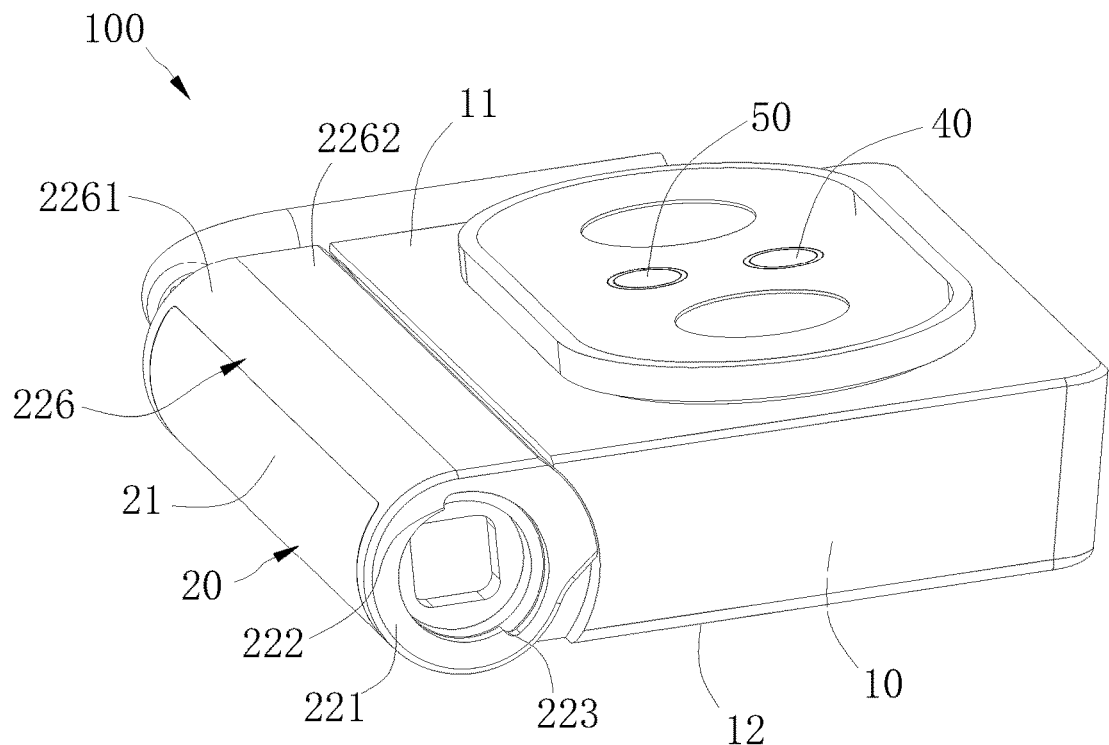
FIG. 9 is a perspective view of an image capturing module according to an embodiment of the present disclosure.

As illustrated in FIG. 6 and FIG. 9, the image capturing module 100 includes an image capturing portion 10 and a rotating shaft portion 20, and the image capturing portion 10 includes an image capturing surface 11 and a non-image capturing surface 12 opposite to each other. The rotating shaft portion 20 is accommodated in the notch 113, and the image capturing portion 10 is rotated with respect to the housing 110 through the rotating shaft portion 20.

The rotating shaft portion 20 includes a rotating shaft 21 and a movable member 22, and the movable member 22 is fitted over the rotating shaft 21 and rotatable with respect to the rotating shaft 21. The image capturing portion 10 is connected with the rotating shaft 21 and configured to rotate among a first position, a second position and a third position driven by the rotating shaft 21.

When being in the first position, the image capturing portion 10 is at least partially received in the accommodating groove 117, and the movable member 22 is limited in a position that the movable member 22 has a smooth connection with the image capturing surface 11, as illustrated in FIG. 6.

Figure 7:
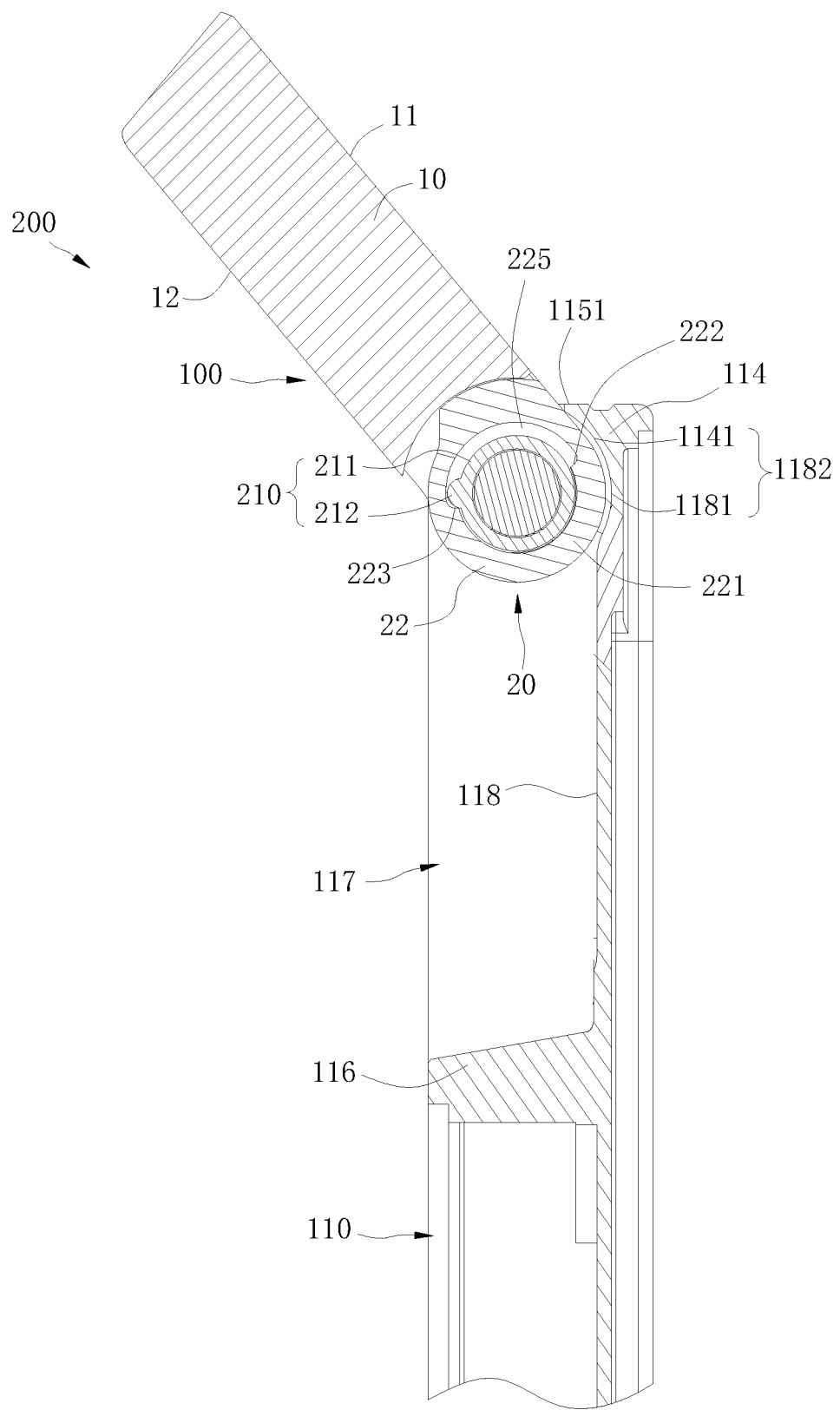
FIG. 7 is a sectional view of the image capturing assembly of FIG. 6 in another state.
Figure 8:
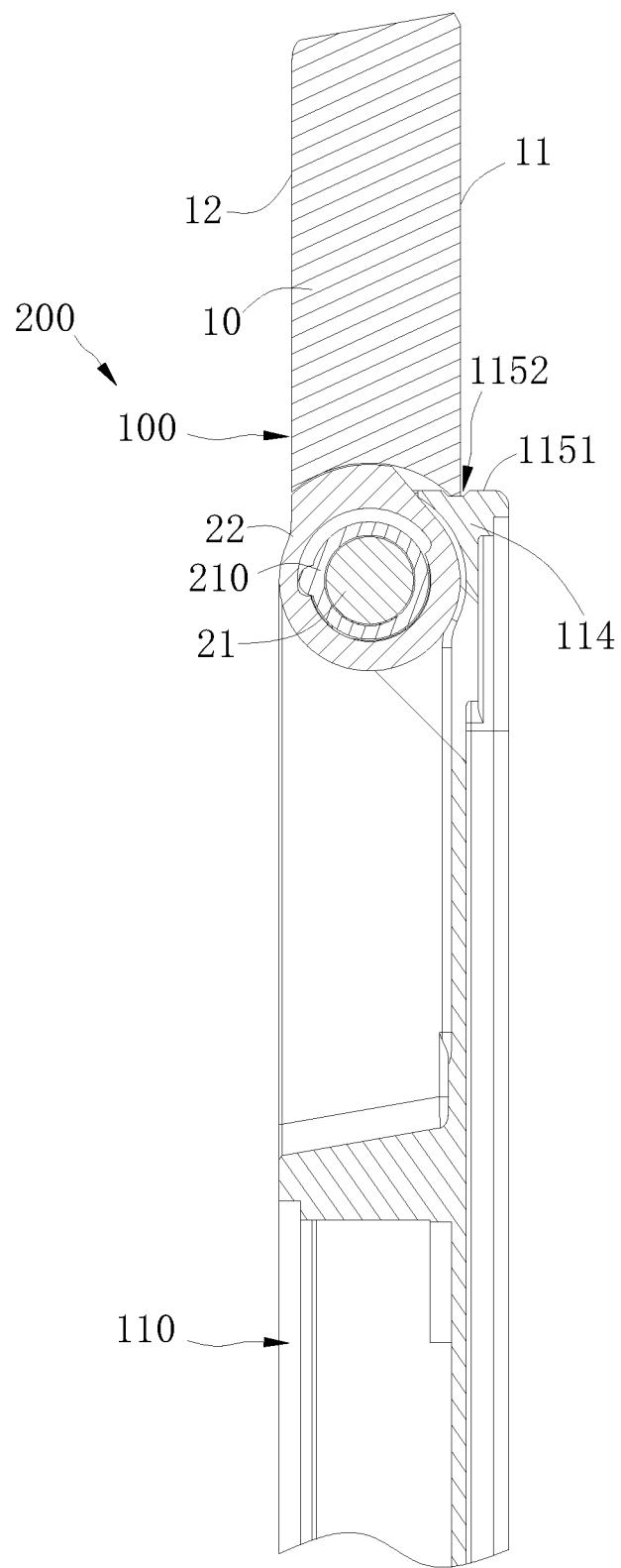
FIG. 8 is a sectional view of the image capturing assembly along a line VIII-VIII in FIG. 5.

When the image capturing portion 10 is rotated from the first position to the second position, the movable member 22 is driven by the rotating shaft 21 to rotate to a position where the movable member 22 abuts against an inner side surface of the notch 113, as illustrated in FIG. 7. When being in the third position, the image capturing portion 10 is fully unfolded with respect to the accommodating groove 117, and the movable member 22 is limited in a position that the movable member 22 has a smooth connection with the non-image capturing surface 12, as illustrated in FIG. 8.

Figure 13:
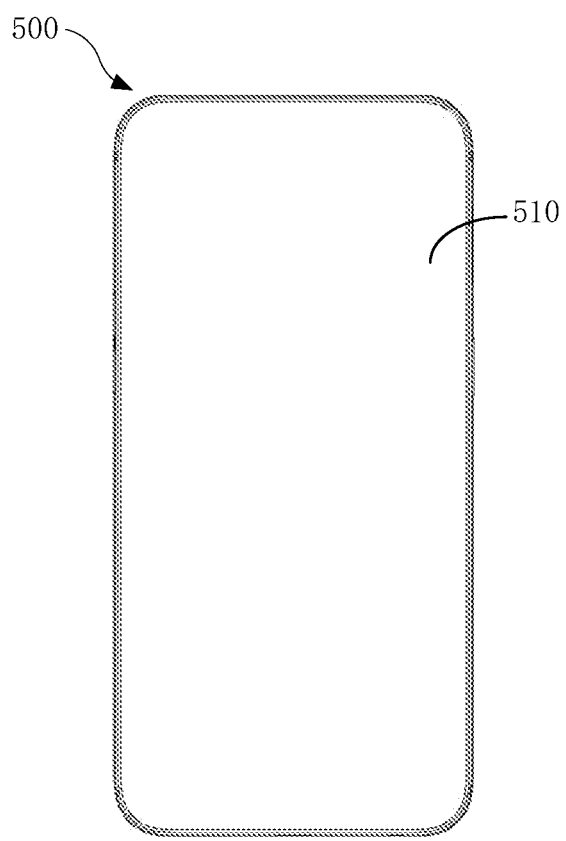
FIG. 13 is a plan view of an electronic device according to an embodiment of the present disclosure.

As illustrated in FIG. 13, the image capturing assembly 200 according to the embodiment of the present disclosure may be applied to an electronic device 500. For example, the electronic device 500 is a mobile terminal such as a mobile phone, an intelligent wearable device or a tablet computer. It may be understood that the electronic device 500 includes, but is not limited to examples of the embodiment.

In the image capturing assembly 200 and the electronic device 500 according to the embodiment of the present disclosure, the movable member 22 enables the image capturing portion 10 to move from the second position to the third position, thus increasing a rotation range of the image capturing portion 10, and ensuring a smooth rotation of the image capturing module 100 for the front image capturing.

In some embodiments, the housing 110 is a front housing of the electronic device 500 and has a roughly rectangular shape. The housing 110 is a carrier member of the electronic device 500 and is configured to carry most parts of the electronic device 500. The housing 110 may be made of plastics or metal materials, or may be configured as an integrated structure by adopting an in-mold injection process with plastics and metal.

In some embodiments, as illustrated in FIG. 1 and FIG. 6, the housing 110 includes a base plate 119, and the side wall 112 extends from an edge of the base plate 119. The base plate 119 is roughly rectangular. That is, the side wall 112 is arranged at the edge of the base plate 119, and the notch 113 is located on a side of the base plate 119. Moreover, the electronic device 500 further includes a display screen 510, and the display screen 510 is enclosed in the housing 110, connected to the side wall 112 and arranged on another side of the base plate 119. This side of the base plate 119 is opposite to the side of the base plate 119 where the notch 113 is. For example, the display screen 510 is arranged on a front side of the base plate 119, and the notch 113 is located on a rear side of the base plate 119.

In the embodiment, the side wall 112 has an annular shape, and the notch 113 is formed at a top portion of the side wall 112, such that the image capturing module 100 is disposed at a top of the electronic device 500. As illustrated by an orientation in FIG. 13, the top of the electronic device 500 is an upper position. The side wall 112 includes a side wall segment 114 corresponding to the notch 113, and the side wall segment 114 protrudes from a bottom surface 118 of the accommodating groove 117 and partially covers the rotating shaft portion 20. In this way, the side wall segment 114 covers at least part of the rotating shaft portion 20, thus reducing a gap between the side wall segment 114 and the rotating shaft portion 20. In addition, the side wall segment 114 can also improve the strength and the reliability of the housing 110.

The image capturing portion 10 has a square shape, and it may be understood that the image capturing portion 10 is provided with cameras and other components therein. The image capturing portion 10 is provided with two cameras therein. For example, one of the cameras is a telephoto camera and the other one thereof is a wide-angle camera. Further, a flashlight may also be provided in the image capturing portion 10 and disposed between the two cameras. The flashlight may supplement light for the electronic device 500. For example, when a user has activities at night, the flashlight may be used to illuminate surrounding scenes. For another example, when the user uses the camera of the electronic device 500 to capture images, the flashlight may supplement light for the image capturing process to improve the image capturing quality of the electronic device 500. It may be understood that both the camera and the flashlight are exposed out of the image capturing portion 10. In addition, the image capturing portion 10 may be provided with other functional elements therein, such as a receiver, a microphone, and the like.

The rotating shaft 21 drives the image capturing portion 10 to rotate to a position where the image capturing portion 10 abuts against an outer surface 1151 of the side wall segment 114, and the side wall segment 114 is configured to prevent the movable member 22 from rotating from the second position to the third position.

As illustrated in FIG. 6, the rotating shaft portion 20 has a roughly cylindrical shape, and provides a rotating center for the rotation of the image capturing portion 10. The side wall segment 114 covering at least part of the rotating shaft portion 20 refers to that there is an overlap between a lateral dimension of the side wall segment 114 and a radial dimension of the rotating shaft portion 20. For example, a lateral dimension L of a part of the side wall segment 114 covering the rotating shaft portion 20 is greater than or equal to half of a radius R of the rotating shaft portion 20. That is, $L/R \geq 1/2$. In an example, the lateral dimension L is 1.5 mm and the radius R is 3 mm. In this case, the lateral dimension L is half of the radius R. It may be understood that the larger the ratio of L/R, the smaller the gap formed between the rotating shaft portion 20 and the side wall segment 114.

When the image capturing portion 10 is in the first position, the image capturing module 100 is a rear image capturing module of the electronic device 500, and thus the electronic device 500 can capture an image of a scene behind the electronic device 500. When the image capturing portion 10 is in the third position, the image capturing module 100 is a front image capturing module of the electronic device 500, and thus the electronic device 500 can capture an image of a scene in front of the electronic device 500.

Generally, the image capturing portion 10 is arranged in the first position. The image capturing portion 10 may be rotated from the first position to the third position according to specific requirements. For example, when the user needs to use the image capturing portion 10 to take a selfie or a video chat, the electronic device 500 may control the image capturing portion 10 to rotate to the third position. Therefore, the electronic device 500 does not need a front camera fixed at a front side thereof, thus saving an internal space of the electronic device 500, avoiding an interference between the front camera and the display screen 510, and thereby increasing a screen-to-body ratio of the electronic device 500. The screen-to-body ratio of the electronic device 500 refers to a ratio of a display area to a non-display area of the electronic device 500 at the front side of the electronic device 500.

When the image capturing portion 10 is rotated from the first position to the third position, an angle rotated by the image capturing portion 10 is greater than or equal to 180 degrees. In this case, an image capturing range of the image capturing portion 10 is relatively large, thus satisfying the requirements of image capturing at different angles.

Figure 4:
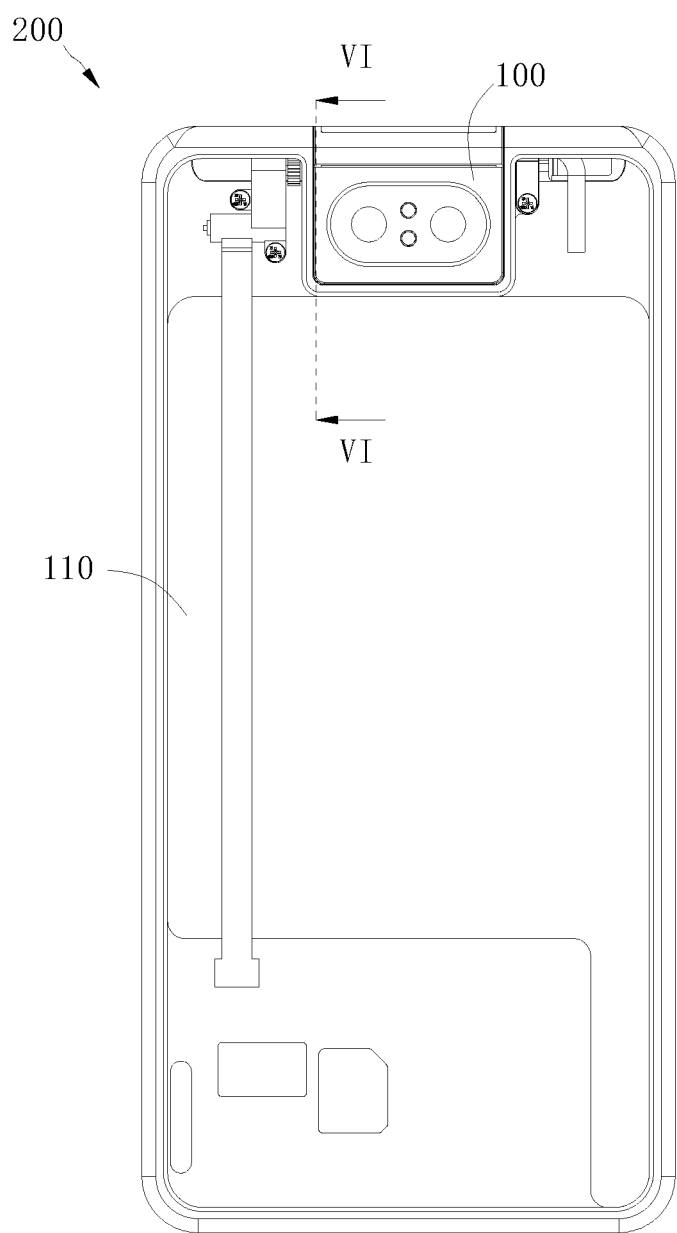
FIG. 4 is a plan view of an image capturing assembly according to an embodiment of the present disclosure.
Figure 5:
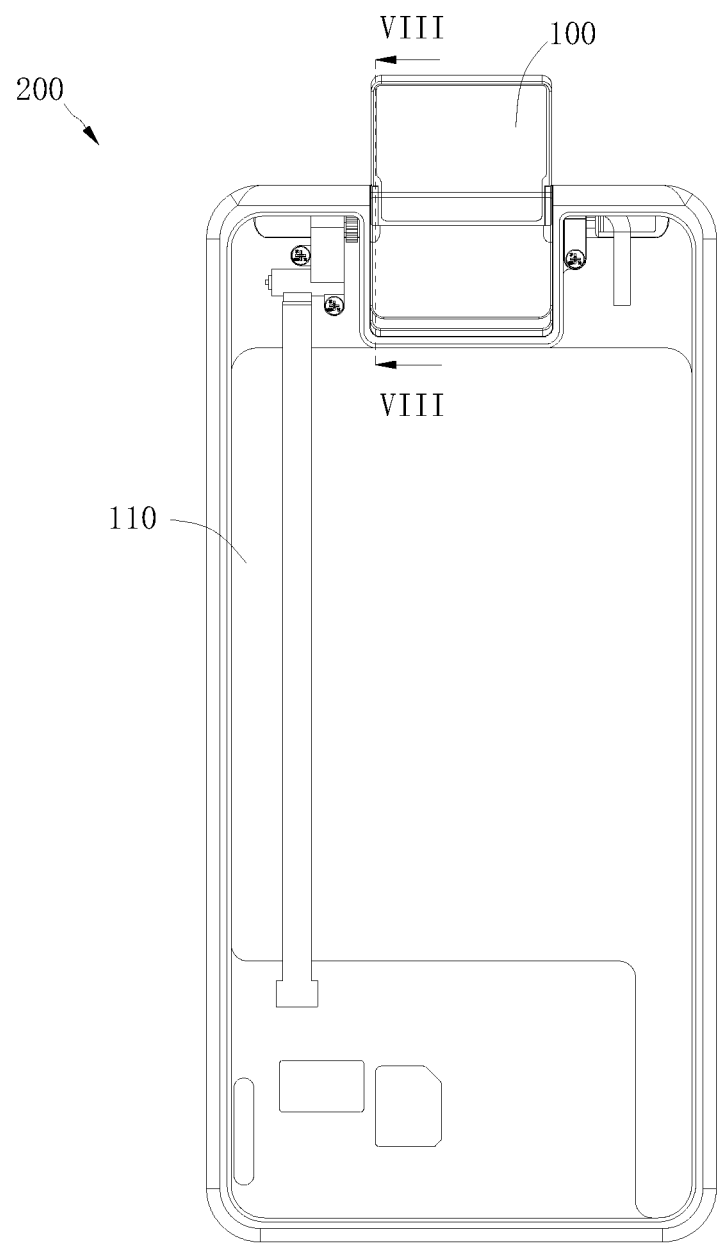
FIG. 5 is a plan view of an image capturing assembly in another state according to an embodiment of the present disclosure.

It should be noted that the image capturing portion 10 may be held at any position between the first position and the third position. For example, the image capturing portion 10 may be held in the second position. For example, the first position is the position illustrated in FIG. 4 or 6, the second position is the position illustrated in FIG. 7, and the third position is the position illustrated in FIG. 5 or 8.

The side wall segment 114 covers at least part of the rotating shaft portion 20 to reduce the gap between the rotating shaft portion 20 and the side wall segment 114. When the image capturing portion 10 is rotated from the first position to the third position, if the rotating shaft portion 20 and the image capturing portion 10 are an integral member, the rotating shaft portion 20 will abut against the inner side surface of the side wall segment 114 such that the image capturing portion 10 cannot continue rotating. Therefore, the side wall segment 114 limits a movement space of the image capturing module 100. In the present disclosure, the movable member 22 is fitted over the rotating shaft 21. It may be understood that the movable members 22 are arranged outside the rotating shaft 21. When the image capturing portion 10 is rotated from the first position to the second position, the movable member 22 abuts against the inner side surface of the side wall segment 114, while the rotating shaft 21 arranged inside the movable member 22 may be rotated from the second position to the third position together with the image capturing portion 10 due to its small size.

Figure 3:
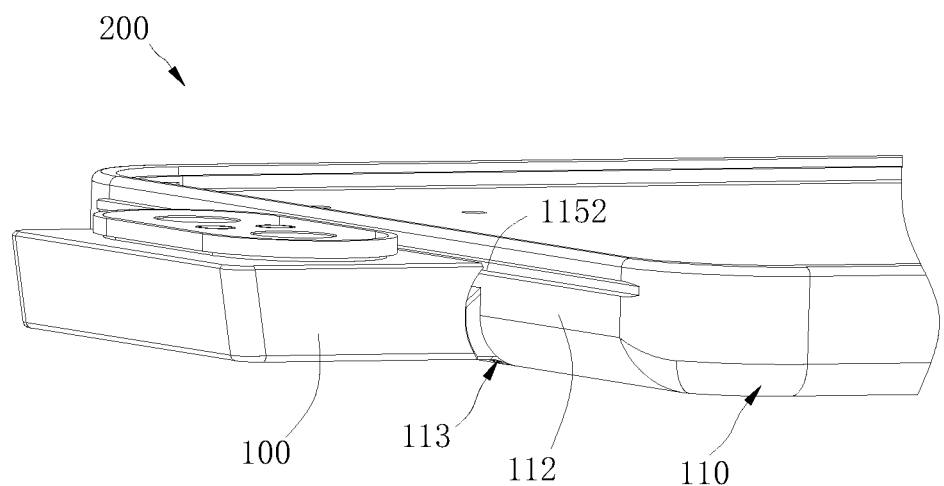
FIG. 3 is a partial perspective view of the image capturing assembly in FIG. 2 from another perspective.

As illustrated in FIG. 2, FIG. 3 and FIG. 7, in some embodiments, the housing 110 includes a surrounding wall 116 connected with the side wall 112, and the surrounding wall 116 and the side wall 112 enclose the accommodating groove 117 communicated with the notch 113. When the image capturing portion 10 is in the first position, the image capturing portion 10 is at least partially accommodated in the accommodating groove 117.

In this way, the surrounding wall 116 may define an independent space for accommodating the image capturing module 100, avoiding an interference between the image capturing portion 10 and other elements of the electronic device 500. In addition, the surrounding wall 116 can prevent internal parts of the electronic device 500 from being exposed, thus improving an appearance performance of the electronic device 500. It may be understood that a dimension of the accommodating groove 117 is larger than that of the image capturing portion 10, and thus the image capturing portion 10 can be accommodated.

In the embodiment, the image capturing portion 10 is partially accommodated in the accommodating groove 117. It may be understood that, in other embodiments, the image capturing portion 10 can be totally accommodated in the accommodating groove 117.

As illustrated in FIG. 7, in some embodiments, an inner surface of the side wall segment 114 includes a first arc surface 1141, and a bottom surface 118 of the accommodating groove is includes a second arc surface 1181. The first arc surface 1141 and the second arc surface 1181 are smoothly connected to form an arc surface 1182 of the housing. The arc surface 1182 of the housing is spaced apart from an outer surface of the rotating shaft portion 20, and a radian of the arc surface 1182 of housing is consistent with that of the rotating shaft portion 20.

In this way, the arc surface 1182 of the housing matches with a contour of the rotating shaft portion 20, such that a fitted structure of the rotating shaft portion 20 and the housing 110 is compact.

As illustrated in FIG. 3 and FIG. 8, in some embodiments, the outer surface 1151 of the side wall 112 is provided with a slot 1152, and when the image capturing portion 10 is in the third position, an edge of the image capturing portion 10 abuts against and received in the slot 1152.

In this way, the slot 1152 allows a close fit of the image capturing portion 10 and the outer surface of the side wall segment 114, such that when the image capturing portion 10 is in the third position, the appearance of the electronic device 500 is aesthetic. The slot 1152 has a strip shape, and a length of the slot 1152 is greater than that of the edge of the image capturing portion 10.

As illustrated in FIG. 7 and FIG. 8, in some embodiments, the image capturing assembly 200 includes a stop member 210 fitted over the rotating shaft 21 and fixed to the housing 110.

The movable member 22 includes a rotating ring 221 arranged at an end of the rotating shaft 21. The rotating ring 221 is provided with a first stop portion 222 and a second stop portion 223. When the image capturing portion 10 is in the first position, the stop member 210 abuts against the first stop portion 222. When the image capturing portion 10 is in the second position or the third position, the stop member 210 abuts against the second stop portion 223.

In this way, since the stop member 210 is fitted with the first stop portion 222 and the second stop portion 223, the movable member 22 can be prevented from being rotated along with the image capturing portion 10 from the second position to the third position, so as not to press the side wall segment 114, thereby protecting the side wall segment 114 and improving the rotation safety of the image capturing portion 10.

When the image capturing portion 10 is rotated from the first position to the second position, the movable member 22 is rotated synchronously with the image capturing portion 10 along with the rotation of the rotating shaft 21 through a static friction force between the movable member 22 and the rotating shaft 21. When the image capturing portion 10 is rotated to the second position, the stop member 210 abuts against the second stop portion 223 to provide an opposite force for the rotation of the movable member 22 (i.e. a force in a direction opposite to a rotation direction of the movable member 22), and the opposite force is greater than the static friction force between the movable member 22 and the rotating shaft 21, so as to prevent the movable member 22 from continuing rotating to the third position. However, the image capturing portion 10 can continue rotating from the second position to the third position.

Figure 10:
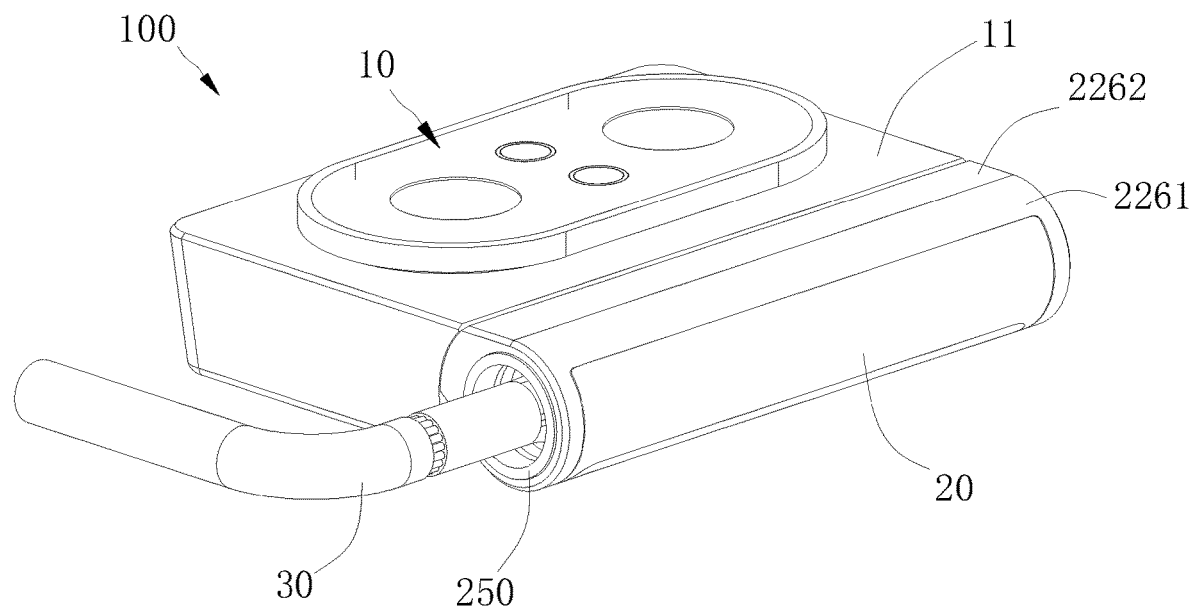
FIG. 10 is a perspective view of the image capturing module in FIG. 9 from another perspective.
Figure 11:
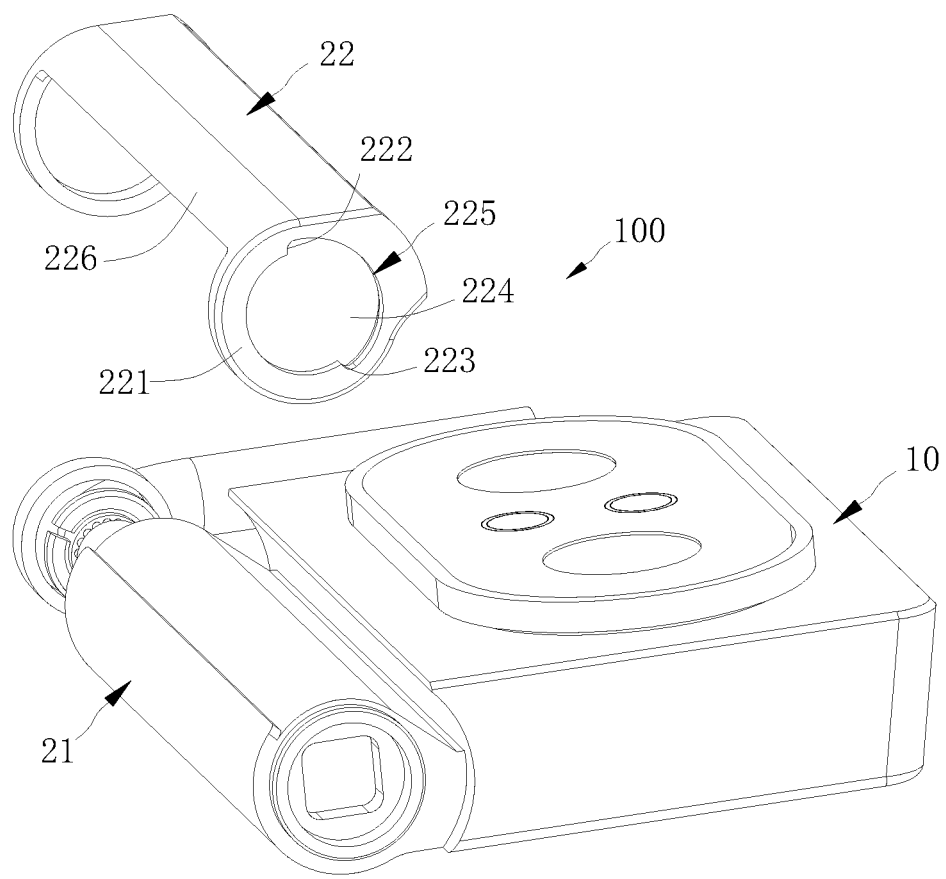
FIG. 11 is an exploded view of an image capturing module according to an embodiment of the present disclosure.
Figure 12:
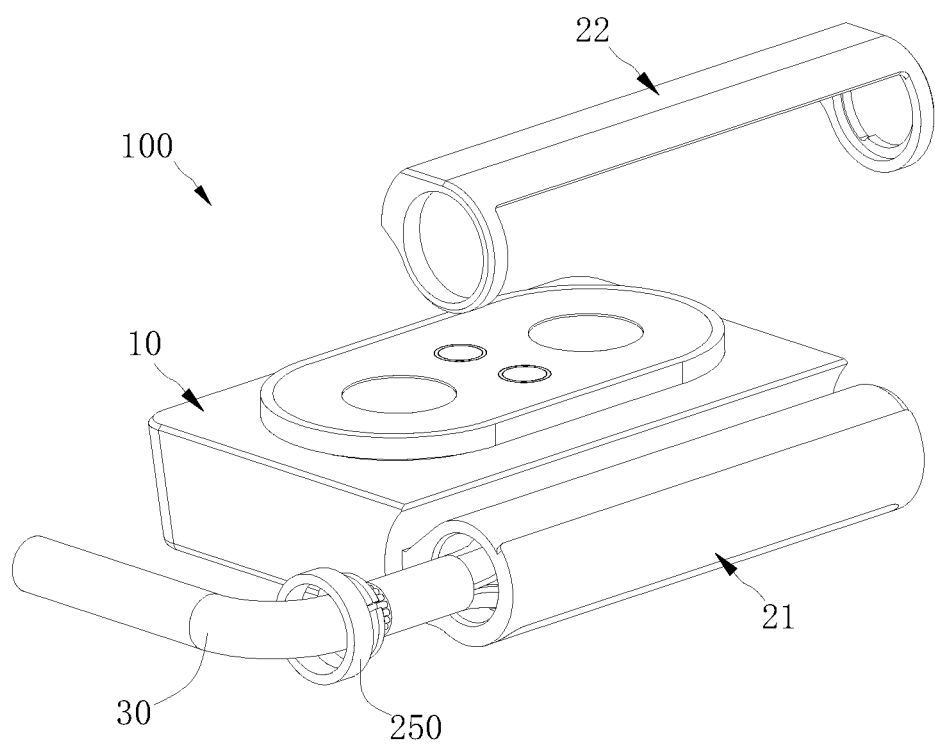
FIG. 12 is an exploded view of the image capturing module in FIG. 11 from another perspective.

As illustrated in FIGS. 10-12, in some embodiments, the rotating ring 221 is provided with a through hole 224, and the rotating shaft 21 is arranged to pass through the through hole 224. An inner side surface of the through hole 224 is provided with an arc groove 225. The first stop portion 222 and the second stop portion 223 are provided at two ends of the arc groove 225, respectively.

As illustrated in FIG. 8, the stop member 210 includes a stop ring 211 and a protrusion 212 arranged on an outer side surface of the stop ring 211, the stop ring 211 is fitted over the rotating shaft 21, and the protrusion 212 extends into the arc groove 225 to abut against the first stop portion 222 or the second stop portion 223.

In this way, the structures of the stop member 210 and the movable member 22 are simple and easy to form, thus reducing the cost of the image capturing module 100. As illustrated in FIG. 6, the protrusion 212 abuts against the first stop portion 222, and as illustrated in FIG. 7 and FIG. 8, the protrusion 212 abuts against the second stop portion 223.

As illustrated in FIG. 6, FIG. 9, FIG. 10 and FIG. 11, in some embodiments, the movable member 22 includes a connecting sheet 226 connected to the rotating ring 221, and the connecting sheet 226 extends along an axial direction of the rotating shaft portion 20. An outer surface of the connecting sheet 226 includes an arc surface 2261 and a flat surface 2262. When the image capturing portion 10 is in the first position, the flat surface 2262 of the connecting sheet 226 has a smooth connection with the image capturing surface 11, and the flat surface 2262 of the connecting sheet 226 is arranged between the arc surface 2261 of the connecting sheet 226 and the image capturing surface 11.

In this way, the movable member 22 is compactly fitted with the image capturing portion 10, thus miniaturizing the image capturing module 100, and also making the electronic device 500 aesthetic.

It should be noted that an orientation of the image capturing surface 11 is the same with an image capturing direction of the image capturing portion 10, and the image capturing surface 11 in the present disclosure is a flat surface.

As illustrated in FIG. 2, in some embodiments, the image capturing assembly 200 includes a driving mechanism 230, and the driving mechanism 230 includes a driving member 231 and a transmission member 232. The transmission member 232 is connected to the rotating shaft 21, and the driving member 231 is configured to drive the rotating shaft 21 to rotate through the transmission member 232.

In this way, the driving mechanism 230 drives the rotating shaft 21 to rotate so as to drive the image capturing module 100 to rotate. For example, the driving member 231 is a motor, and the transmission member 232 is a transmission gear. A processor of the electronic device 500 may control the driving mechanism 230 to operate, so as to control the image capturing portion 10 to rotate to different positions.

In some embodiments, the image capturing module 100 includes a wire 30. The wire 30 is connected to the components in the image capturing portion 10 and extends out of the image capturing module 100 through the rotating shaft 20.

In this way, the wire 30 may transmit signals and provide electric energy to the image capturing module 100. In some embodiments, the wire 30 is a coaxial line, such that the wire 30 tends not to be twisted and damaged when the image capturing portion 10 is rotated, and thus the service life of the wire 30 is prolonged.

In some embodiments, the image capturing assembly 200 includes a wire clip 240, and the wire clip 240 is fixed to the housing 110 and clamps the wire 30. For example, the wire clip 240 may be fixed to the housing 110 with a fastener such as a screw. In this way, the wire clip 240 can avoid that the wire 30 arranged in the image capturing module 100 is subjected to an external pulling force and thus cannot be normally connected with the components inside the image capturing module 200.

In some embodiments, as illustrated in FIG. 10, the image capturing assembly 200 further includes a wire gathering ring 250 arranged to the wire 30 and embedded in the image capturing module 100. The wire gathering ring 250 is configured to gather the wire 30. It may be understood that when a plurality of wires 30 are provided, the plurality of wires 30 tend to be loose and occupy a relatively large space volume. The wire gathering ring 250 gathers the wires 30, so as to reduce the space occupied by wires 30. It may be understood that when a clamping force of the wire gathering ring 250 is large enough, the wire gathering ring 250 can also clamp the wires 30 to prevent the wires 30 from being loosened.

Reference throughout this specification to terms "an embodiment," "some embodiments," "an illustrative embodiment," "an example," "a specific example," or "some examples" means that a particular feature, structure, material, or characteristic described in connection with the embodiment or example is included in at least one embodiment or example of the present disclosure. In this specification, the appearances of the aforesaid terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations may be made in the embodiments without departing from principles and purposes of the present disclosure. The scope of this disclosure is defined by the claims and their equivalents.

What is claimed is:

1. An image capturing assembly, comprising:
   a housing comprising a side wall, the side wall having a notch, the housing being provided with an accommodating groove communicated with the notch;
   an image capturing module comprising an image capturing portion and a rotating shaft portion, the image capturing portion having an image capturing surface and a non-image capturing surface opposite to each other, the rotating shaft portion being accommodated in the notch, and the image capturing portion being rotatably connected with the housing through the rotating shaft portion; and
   a stop member fitted over a rotating shaft and fixed to the housing,
   wherein the rotating shaft portion comprises the rotating shaft and a movable member, the movable member is fitted over the rotating shaft, the image capturing portion is connected with the rotating shaft and configured to be driven by the rotating shaft to rotate among a first position, a second position and a third position,
   wherein when being in the first position, the image capturing portion is at least partially received in the accommodating groove, and the movable member is limited in a position that the movable member has a smooth connection with the image capturing surface; when the image capturing portion is rotated from the first position to the second position, the movable member is driven by the rotating shaft to rotate to abut against an inner side surface of the notch; when being in the third position, the image capturing portion is fully unfolded with respect to the accommodating groove, and the movable member is limited in a position that the movable member has a smooth connection with the non-image capturing surface,
   wherein the movable member comprises a rotating ring arranged at an end of the rotating shaft, and the rotating ring is provided with a first stop portion and a second stop portion,
   wherein when the image capturing portion is in the first position, the stop member abuts against the first stop portion, and when the image capturing portion is in the second position or the third position, the stop member abuts against the second stop portion,
   wherein the movable member comprises a connecting sheet connected to the rotating ring, the connecting sheet extends along an axial direction of the rotating shaft portion, and an outer surface of the connecting sheet comprises an arc surface and a flat surface, and
   wherein when the image capturing portion is in the first position, the flat surface of the connecting sheet has a smooth connection with the image capturing surface, and the flat surface of the connecting sheet is arranged between the arc surface of the connecting sheet and the image capturing surface.

2. The image capturing assembly according to claim 1, wherein the housing comprises a surrounding wall connected with the side wall, and the surrounding wall encloses an accommodating groove together with the side wall.

3. The image capturing assembly according to claim 1, wherein the side wall comprises a side wall segment arranged corresponding to the notch, and the side wall segment protrudes from a bottom surface of the accommodating groove and partially covers the rotating shaft portion.

4. The image capturing assembly according to claim 3, wherein an inner surface of the side wall segment comprises a first arc surface, the bottom surface of the accommodating groove comprises a second arc surface, the first arc surface and the second arc surface are smoothly connected to form an arc surface of the housing, the arc surface of the housing is spaced apart from an outer surface of the rotating shaft portion, and a radian of the arc surface of the housing is consistent with a radian of the rotating shaft portion.

5. The image capturing assembly according to claim 1, wherein an outer surface of the side wall is provided with a slot, and when the image capturing portion is in the third position, an edge of the image capturing portion abuts against and is received in the slot.

6. The image capturing assembly according to claim 1, wherein the rotating ring is provided with a through hole, the rotating shaft is arranged to pass through the through hole, an inner side surface of the through hole is provided with an arc groove, and the first stop portion and the second stop portion are arranged at two ends of the arc groove, respectively; and
   the stop member comprises a stop ring and a protrusion arranged on an outer side surface of the stop ring, the stop ring is fitted over the rotating shaft, and the protrusion extends into the arc groove to abut against the first stop portion or the second stop portion.

7. The image capturing assembly according to claim 1, further comprising a driving mechanism, wherein the driving mechanism comprises a driving member and a transmission member, the transmission member is connected to the rotating shaft, and the driving member is configured to drive the rotating shaft to rotate through the transmission member.

8. The image capturing assembly according to claim 1, further comprising a wire, the wire being connected to components in the image capturing portion and extending out of the image capturing module through the rotating shaft.

9. The image capturing assembly according to claim 8, further comprising a wire clip, the wire clip being fixed to the housing and clamping the wire.

10. The image capturing assembly according to claim 1, wherein when the image capturing portion is rotated from the first position to the third position, an angle rotated by the image capturing portion is greater than or equal to 180 degrees.

11. The image capturing assembly according to claim 1, wherein a functional component is provided in the image capturing portion and the functional component comprises one or more of a flashlight, a receiver and a microphone.

12. An electronic device, comprising:
a housing comprising a base plate and a side wall arranged at an edge of the base plate, the side wall having a notch on a side of the base plate, the housing being provided with an accommodating groove communicated with the notch;
a display screen enclosed in the housing, connected to the side wall and arranged on another side of the base plate opposite to the side of the base plate where the notch is;
an image capturing module comprising an image capturing portion and a rotating shaft portion, the image capturing portion comprising an image capturing surface and a non-image capturing surface opposite to each other, the rotating shaft portion being accommodated in the notch, and the image capturing portion being rotatably connected with the housing through the rotating shaft portion; and
a stop member fitted over a rotating shaft and fixed to the housing,
wherein the rotating shaft portion comprises the rotating shaft and a movable member, the movable member is fitted over the rotating shaft, the image capturing portion is connected with the rotating shaft and configured to be driven by the rotating shaft to rotate among a first position, a second position and a third position,
wherein when being in the first position, the image capturing portion is at least partially received in the accommodating groove, the movable member is limited in a position that the movable member has a smooth connection with the image capturing surface; when the image capturing portion is rotated from the first position to the second position, the movable member is driven by the rotating shaft to rotate to abut against an inner side surface of the notch; when being in the third position, the image capturing portion is fully unfolded with respect to the accommodating groove, and the movable member is limited in a position that the movable member has a smooth connection with the non-image capturing surface,
wherein the movable member comprises a rotating ring arranged at an end of the rotating shaft, and the rotating ring is provided with a first stop portion and a second stop portion,
wherein when the image capturing portion is in the first position, the stop member abuts against the first stop portion, and when the image capturing portion is in the second position or the third position, the stop member abuts against the second stop portion,
wherein the movable member comprises a connecting sheet connected to the rotating ring, the connecting sheet extends along an axial direction of the rotating shaft portion, and an outer surface of the connecting sheet comprises an arc surface and a flat surface, and
wherein when the image capturing portion is in the first position, the flat surface of the connecting sheet has a smooth connection with the image capturing surface, and the flat surface of the connecting sheet is arranged between the arc surface of the connecting sheet and the image capturing surface.

13. The electronic device according to claim 12, wherein the side wall comprises a side wall segment arranged corresponding to the notch, and the side wall segment protrudes from a bottom surface of the accommodating groove and partially covers the rotating shaft portion.

14. The electronic device according to claim 13, wherein an inner surface of the side wall segment comprises a first arc surface, a bottom surface of the accommodating groove comprises a second arc surface, the first arc surface and the second arc surface are smoothly connected to form an arc surface of the housing, the arc surface of the housing is spaced apart from an outer surface of the rotating shaft portion, and a radian of the arc surface of the housing is consistent with a radian of the rotating shaft portion.

15. The electronic device according to claim 12, wherein the rotating ring is provided with a through hole, the rotating shaft is arranged to pass through the through hole, an inner side surface of the through hole is provided with an arc groove, and the first stop portion and the second stop portion are arranged at two ends of the arc groove, respectively; and
the stop member comprises a stop ring and a protrusion arranged on an outer side surface of the stop ring, the stop ring is fitted over the rotating shaft, and the protrusion extends into the arc groove to abut against the first stop portion or the second stop portion.

16. An image capturing assembly, comprising:
a housing comprising a side wall having a notch;
an image capturing module comprising a rotating shaft portion accommodated in the notch and an image capturing portion rotatably connected to the housing through the rotating shaft portion, the image capturing portion having an image capturing surface and a non-image capturing surface opposite to each other; and
a stop member fitted over a rotating shaft and fixed to the housing,
wherein the rotating shaft portion comprises the rotating shaft and a movable member, the movable member is fitted over the rotating shaft and rotatable with respect to the rotating shaft, the image capturing portion is connected with the rotating shaft and configured to be driven by the rotating shaft to switch among a first position, a second position and a third position,
wherein when the image capturing portion is in the first position, at least part of the image capturing portion is received in the housing, and the movable member has a smooth connection with the image capturing surface; when the image capturing portion is rotated from the first position to the second position, the movable member is driven by the rotating shaft to rotate until it abuts against an inner side surface of the notch; when being in the third position, the image capturing portion is completely unfolded out of the housing, and the movable member has a smooth connection with the non-image capturing surface, wherein the movable member comprises a rotating ring arranged at an end of the rotating shaft, and the rotating ring is provided with a first stop portion and a second stop portion, wherein when the image capturing portion is in the first position, the stop member abuts against the first stop portion, and when the image capturing portion is in the second position or the third position, the stop member abuts against the second stop portion, wherein the movable member comprises a connecting sheet connected to the rotating ring, the connecting sheet extends along an axial direction of the rotating shaft portion, and an outer surface of the connecting sheet comprises a arc surface and a flat surface, and wherein when the image capturing portion is in the first position, the flat surface of the connecting sheet has a smooth connection with the image capturing surface, and the flat surface of the connecting sheet is arranged between the arc surface of the connecting sheet and the image capturing surface.

* * * * *